United States Patent [19]

Cook

[11] Patent Number: 5,482,722
[45] Date of Patent: Jan. 9, 1996

[54] CONFECTIONS COMPRISING A PROTEINACEOUS CHEWABLE BASE

[75] Inventor: Richard B. Cook, Chelmsford, Mass.

[73] Assignee: Opta Food Ingredients, Inc., Bedford, Mass.

[21] Appl. No.: 311,930

[22] Filed: Sep. 26, 1994

[51] Int. Cl.⁶ .................................................. A23G 3/30
[52] U.S. Cl. ................................ 426/3; 426/656; 426/660
[58] Field of Search ................................ 426/3–6, 656

[56] References Cited

U.S. PATENT DOCUMENTS

| | | | |
|---|---|---|---|
| 1,887,930 | 11/1932 | Hatherell | 426/3 |
| 2,044,769 | 6/1936 | Buron et al. | 426/656 |
| 2,154,482 | 4/1939 | Weber | 426/3 |
| 2,203,436 | 6/1940 | Kertess | 426/3 |
| 2,469,861 | 5/1949 | Cohoe | 426/3 |
| 2,489,147 | 11/1949 | Lougovoy | 426/3 |
| 2,586,675 | 2/1952 | Lutz | 426/3 |
| 2,946,780 | 7/1960 | Barker et al. | 426/656 |
| 3,814,815 | 6/1974 | Hashimoto et al. | 426/3 |
| 3,826,847 | 7/1974 | Ogawa et al. | 426/3 |
| 4,863,745 | 9/1989 | Zibell | 426/5 |
| 4,919,941 | 4/1990 | Zibell | 426/5 |
| 4,931,295 | 6/1990 | Courtright et al. | 426/5 |
| 4,975,287 | 12/1990 | Zibell et al. | 426/3 |
| 5,077,053 | 12/1991 | Kuncewitch et al. | 424/441 |

FOREIGN PATENT DOCUMENTS

| | | |
|---|---|---|
| 89/05589 | 6/1989 | WIPO . |
| 94/17673 | 8/1994 | WIPO . |

*Primary Examiner*—Jeanette Hunter
*Attorney, Agent, or Firm*—Hamilton, Brook, Smith & Reynolds

[57] ABSTRACT

Confections containing a proteinaceous chewable base which reduces stickiness but retains elastic characteristics, compared to traditional confections. In a preferred embodiment, biodegradable and non-stick chewing gum and chewing gum bases comprising prolamine are described.

59 Claims, No Drawings

5,482,722

CONFECTIONS COMPRISING A PROTEINACEOUS CHEWABLE BASE

BACKGROUND OF THE INVENTION

Conventional chewing gums contain a synthetic resin base (e.g., styrene butadiene, isobutylene rubber, polyvinyl acetate) that softens at 50°–60° C., at which temperature the resin becomes sticky. The sticky resin is then formulated into a gum by admixture with sugar and other ingredients to saturate the sticky surfaces of the resin. The gum base represents approximately 20% of the dry weight of the final gum product, i.e, 15–30%, whereas the remainder of the gum is primarily sugar. Although the gum resin has been saturated with sugar, it still possesses adequate tack to stick to foil wrappers and other conventional gum packaging. In order to obviate the problem of package adherence, many techniques have been developed to provide a means for releasing and/or preventing adhesion between the sugared gum base and its packaging. For example, the gum base can be dusted with substances which have a higher molecular weight and are more hydrophobic than sugar, such as starch and other polysaccharides.

The protective coating only prevents adherence to a substrate prior to usage, however, extended chewing of the gum will release all of the entrapped sugar, thereby causing the gum base to return to its original degree of stickiness. The spent gum retains its stick property over a considerable period of time and is not biodegradable. Besides being nonbiodegradable, spent conventional gums can become imbedded into synthetic and natural fiber surfaces, such as furniture, clothing, carpets, sidewalks and hair. Removal of gum from such surfaces often requires use of highly toxic solvents (e.g., carbon tetrachloride) or Freon (to quick-freeze the gum) which is damaging to the ozone layer.

Thus, there remains a need for a chewing gum having a resin base that will not become sticky upon removal of its sugar component and which ultimately will not possess the sticky properties of conventional chewing gums from an environmental point of view.

SUMMARY OF THE INVENTION

This invention pertains to traditionally sticky/chewy confections which are modified in degree of stickiness and tack. The confections comprise a proteinaceous chewable base which reduces stickiness but retains elastic characteristics, compared to traditional confections. Suitable traditional confections include chewing gum, caramel, nougat, taffy and candies which are sticky/chewy.

In one embodiment, the invention pertains to proteinaceous chewing gum bases, to chewing gum containing the proteinaceous chewing bases and to methods of manufacture. The proteinaceous chewing gum base predominantly comprises prolamine which enables the gum base to readily biodegrade. The gum base further comprises other components which enhance the pliability and elasticity of the chewing gum base. It has been discovered that the chewing gum base and gum possess non-adhesive properties after the gum or gum base has been chewed and the sugar component is removed. When the gum is removed from the mouth, the spent gum will dry into a solid mass that is not sticky, unlike traditional gums which retain their elasticity and tack for an extendable period of time. An additional benefit of the proteinaceous gum base and a gum product containing the gum base is that it is biodegradable and digestible.

In another embodiment, prolamine such as zein is incorporated into traditional confection formulations. The prolamine reacts with plasticizers or texturizing agents that are present in the confection formulation to form the proteinaceous chewable base. For example, an aqueous alcohol solution of zein can be mixed into melted caramel. The solvent is then evaporated to yield a caramel which has reduced stickiness compared to the starting caramel but retains the elasticity which is an expected property of caramel.

DETAILED DESCRIPTION OF THE INVENTION

This invention pertains to confections comprising a proteinaceous chewable base which when added to the confection reduces stickiness and tack of the confection yet retains its elastic characteristics. Confections that are traditionally sticky/chewy in texture are suitable candidates for incorporation of the proteinaceous chewable base. Examples of confections include but are not limited to chewing gum, caramel, nougat, taffy and the like. From a commercial and consumer point of view, it is advantageous to reduce stickiness but retain elasticity of the confection.

In one aspect, the invention pertains to novel proteinaceous chewing gum bases, chewing gums containing the proteinaceous chewing gum bases and methods of making these. The proteinaceous chewing gum base described herein possesses non-adhesive properties after the base has been chewed compared to conventional chewing gum bases. The term "chewing gum base", as used herein, refers to the non-flavored or non-sweetened portion of the chewing gum, i.e. the components of the chewing gum which determine its texture and remain chewable in the mouth after the flavoring and/or sweetening agents have been released. The term "chewing gum" comprises the chewing gum base and one or more flavoring and/or sweetening agents which impart to the chewing gum a pleasant or desirable taste.

The novel proteinaceous chewing gum base of this invention is soft and pliable when chewed, but has non-adhesive properties after the chewed gum is removed from the mouth and the sugar component has been removed. The terms "non-adhesive properties" and "non-stick" collectively are intended to mean herein that the gum's surface will have little or no adherence to commonly encountered substrates such as wool, cloth, rugs, hair and shoes when the sugar component has been removed. In fact, when the gum is removed from the mouth, it will dry into a solid mass that is not sticky, unlike traditional gums which retain their elasticity and tack for an extended period of time. The proteinaceous gum base possesses many characteristics that make them suitable for use in chewing gum which are comparable to conventional gum bases, but without the sticky attributes. An additional property of the chewing gum base described herein is that it is biodegradable, meaning that it consists essentially of components that are easily biodegraded. Easily biodegraded is intended to mean a composition having greater than or equal to 50% of its mass digested or substantially hydrolyzed by mammalian intestinal flora and/or soil bacteria. It is noted that while some of the components of the gum bases described herein are not "easily biodegraded", such as wax, polyvinylacetate and synthetic and natural gums, the predominance of prolamine cause the composition to break down.

In one embodiment, the proteinaceous chewing gum base comprises prolamine and a texturizing agent. A "texturizing agent", as used herein, is an agent which when incorporated into the chewing gum base increases its elasticity, compared to a chewing gum base consisting solely of prolamine which is hard and unchewable. Examples of texturizing agents include a food grade organic acid, a food grade mineral acid, amino acids (e.g. cysteine), amine salts (e.g. ethanol amine hydrochloride), polymeric acids (e.g., pectic acid), Lewis acid salt, C1–C5 alkyl ester of an organic acid, C3–C4 hydroxyalkyl ester of an organic acid, a C1–C5 alkyl ester of an α-hydroxy acid, a salt of an organic acid, a salt of an α-hydroxy acid and combinations thereof. Suitable Lewis acid salts include ferric chloride, ammonium chloride, aluminum chloride, calcium chloride and combinations thereof. Suitable salts of organic acids and α-hydroxy acids include sodium, potassium, lithium, calcium, magnesium and aluminum salts thereof. Suitable food grade organic acids include α-hydroxy acids, mono-, di- and tri- carboxylic acids and combinations thereof. α-Hydroxy acids are preferred and are selected from the group consisting of lactic acid, tartaric acid, citric acid and malic acid. Lactic acid is a preferred α-hydroxy acid. Suitable mineral acids include phosphoric acid, hydrochloric acid, sulfuric acid and combinations thereof. It is noted that when the chewing gum base components are acid labile (e.g., in the case of polyvinylacetate) then an ester or organic acid salt as described above must be used instead of an acid as the texturizing agent.

The preferred proteins are hydrophobic grain proteins known generally as prolamines. Prolamines are characterized by their insolubility in water and solubility in aqueous alcohol (e.g., aqueous solutions of water and ethanol or 2-propanol, for example, containing at least 60% alcohol), and by the presence in the protein of large amounts of hydrophobic amino acids such as proline, glutamine and asparagine. The unusual solubility characteristics of prolamines are based on the fact that they have a low incidence of polar amino acids. Prolamines are found in high concentrations in various grains, such as corn, wheat, barley, rice and sorghum.

A preferred prolamine for use in the present composition and method is a high titer alcohol-soluble protein fraction of corn (*Zea mays*), named zein. The potential yield of zein is about one pound per bushel of corn. Zein can be readily obtained from corn gluten, which is a byproduct of the corn wet milling industry. Both commercially available grades, with associated impurities, and purified forms of zein can be used. Preferably, the zein will be deflavored and decolored such that typical off-flavors and colors that are natural characteristics of zein have been removed. Removal of the off-flavors and colors is desirable so as not to interfere or conflict with the chewing gum ingredients, such as the desired colorants and flavoring and/or sweetening agents. Methods for making decolored and deflavored zein are described in U.S. Pat. No. 5,254,673, the entire teachings of which are incorporated by reference herein. Other suitable prolamines include gliadin of wheat, horedein of barley, and combinations of more than one prolamine.

A chewing gum base which consists solely of zein is unchewable. The addition of a texturizing agent such as an α-hydroxy acid to the chewing gum base increases elasticity and prevents hardening. A sufficient amount of α-hydroxy acid is added to the zein to prevent hardening of the gum base caused by chewing and preserve its elasticity. An increase in elasticity occurs when the amount of α-hydroxy acid is greater than about 20% by weight of the zein solid. Increased stickiness before chewing occurs when α-hydroxy acid is present in the chewing gum base. This level of stickiness is preferred for incorporating sugar into the gum base. Preferably, the α-hydroxy acid is present at from about 35% to about 40% by weight of the chewing gum base.

In another embodiment, the proteinaceous chewing gum base comprises prolamine, an emulsifier, a wax and/or oil and optionally a texturizing agent. Suitable waxes, oils and emulsifiers are those that are acceptable for use in food, some of which are listed below by way of example. A sufficient amount of wax and emulsifier are used so that the chewing gum base has a soft texture and can be conveniently chewed for over thirty minutes without becoming fibrous or tough, but not so much that the spent chewing gum base becomes sticky and adhesive after chewing. The chewing gum base comprises from about 1% to about 49% by weight wax and from about 0.5% to 15% by weight emulsifier (weight percentages, unless otherwise noted are "dry weight", i.e. when the chewing gum base contains less than about 10% water). Preferably, the chewing gum base comprises about 30% by weight wax and about 10% by weight emulsifier.

Naturally occurring and synthetic waxes can be used and include beeswax, paraffin wax, japan wax, ceresin wax, carnauba, microcrystalline wax, sugarcane wax, rice bran wax, candelilla wax, petroleum wax, synthetic petroleum wax, and naturally or synthetically occurring resins. Beeswax, candelilla wax and rice bran wax are preferred.

Suitable emulsifiers include those emulsifiers with a hydrophilic lipophilic balance (HLB) greater than or equal to 2. HLB refers to the relative size or length of the hydrophilic arm versus the hydrophobic arm of an emulsifier. Examples of useful emulsifiers include monoglycerides, hydroxycarboxylic fatty acid esters, lactylate fatty acid esters, polyglycerol fatty acid esters, phosphotides, ethylene or propylene glycol fatty acid esters, and sorbitan fatty acid esters. Glyceryl monolaurate is preferred.

Chewing gum bases comprising prolamine, a wax and an emulsifier, as described above, can have a slight waxy taste. A sufficient amount of an oil can be used to act as a plasticizer and to add texture and remove any objectionable waxiness. The precise amount of oil to be used varies according to the taste of the individual and can be determined by routine experimentation. Suitable amounts of oil are from about 0.5% by weight to about 60% by weight of the gum base. For the purposes of this invention the oil can be any solid or liquid triglyceride, fat mimetic, reduced fat or synthetic oil which is acceptable for use in food.

In another embodiment, any of the proteinaceous chewing gum bases described above can additionally comprise a traditional gum base which includes synthetic and natural gums. Synthetic gum bases include styrene butadiene rubber, isobutylene rubber and isobutylene/isoprene copolymer. Polyvinylacetate is also a suitable traditional gum base when used with non-acidic formulations. Polyvinylacetate, isobutylene rubber and styrene butadiene rubber are preferred. Natural gum bases include chicle, pontianak gum, jell, tong gum and the like. The amount of gum is from about 15% to about 40% by weight. In order to retain the biodegradability of the spent gum, it is important that the gum base comprise at least 50% biodegradable components.

A proteinaceous chewing gum base of this invention is made by first preparing a solution comprising prolamine in an alcohol/water solvent system in which prolamine is soluble. A suitable alcohol/water solvent system is about 60% by volume to about 95% by volume ethanol. This range may differ slightly for isopropanol or n-propanol. The solution must be stirred or mixed until the prolamine is completely dissolved. A texturizing agent is added to cause the prolamine to precipitate and as a result entraps the texturizing agent therein, thereby forming the chewing gum base.

The chewing gum base is then separated from the remaining solvent, for example by decanting the solvent from the precipitated base. Alternatively, the separation can be achieved by evaporation of the solvent, either by heating at temperatures up to 70° C. or by subjecting the chewing gum base to high vacuum (27 to 29 inches of mercury at 20° C.).

An ethanolic solution of a prolamine can be precipitated by adding an aqueous solution of a mineral acid or aqueous solution of an inorganic salt to the solution. Precipitation of prolamine entraps the texturizing agent or inorganic salt to form a chewing gum base comprising prolamine and the mineral acid or inorganic salt. The inorganic salt and mineral acid must be suitable for use in food. Suitable mineral acids include hydrochloric acid and sulfuric acid. Phosphoric acid does not form a zein coagulum but does form a latex under the above conditions. Suitable inorganic salts include calcium chloride and ammonium chloride. Preferably the amount of mineral acid or inorganic salt will be from about 1% to about 2% by volume.

In another aspect, a solution comprising prolamine and an alcohol/water solvent is added to a solution containing a texturizing agent such as an organic acid suitable for use in food or phosphoric acid or amino acid to form a stable latex or dispersion. Prolamine is precipitated from the latex by the addition of a sufficient amount of base to precipitate the prolamine. As the prolamine precipitates, it entraps the organic acid or phosphoric acid and forms the chewing gum base which comprises prolamine and the organic acid or phosphoric acid. Sufficient base is added to bring the pH of the solution into the range in which the prolamine latex is no longer stable, i.e. greater than or equal to approximately 4. Any base which is acceptable for use in food and which does not adversely affect the taste of the chewing gum base can be used. Preferred bases include sodium hydroxide, potassium hydroxide, potassium carbonate, sodium carbonate and triethanolamine. Especially preferred is sodium hydroxide. Alternatively, the texturizing agent can be an ester or a salt of an acid or base. In those instances, the prolamine is precipitated by adding a neutral salt as the precipitating agent. As yet another alternative, the prolamine can be precipitated from solution by adjusting the water content to an amount in which the prolamine latex is no longer stable.

In another embodiment, a chewing gum base comprising prolamine and polyvinylacetate is made by preparing an aqueous alcohol solution of prolamine and polyvinylacetate. Prolamine is precipitated by combining the aqueous alcohol solution with water to thereby coprecipitate the polyvinylacetate and the prolamine as the chewing gum base.

The chewing gum base can also be made by adding a wax latex or an emulsion to a solution comprising the prolamine. A sufficient quantity of water, aqueous solution or emulsion must be used such that the percentage of water in the resulting solution is outside the range, described hereinabove, in which the prolamine is soluble. Preferably, an emulsion is used to precipitate prolamine. When the gum base is made this way it is easy to make a homogenous mixture. At this stage other solid ingredients can be added to provide better homogeneity rather than their addition to a premade gum base. The emulsion comprises an emulsifier, a wax and/or oil. As a result of combining the solution and the emulsion, the prolamine is precipitated whereby the emulsifier and the wax and/or oil are entrapped therein to form a homogeneous mixture. Optionally, the chewing gum base can also comprise a texturizing agent and/or traditional gum base.

In another aspect, the chewing gum base is made by preparing a solution of prolamine and a traditional gum base in an alcohol/water solvent system and then combining with an emulsion comprising an emulsifier, a wax and/or oil suitable for use in foods. The combination is then stirred or mixed until all the components are completely dissolved. The solvent is then removed by heating the mixture for a sufficient period of time and at a sufficient temperature to form a homogeneous mixture, A suitable temperature for heating the mixture ranges from about 45° C. to about 75° C., and is preferably about 55° C. Suitable traditional gums include styrene butadiene, isobutylene/isoprene copolymer or isobutylene rubber. The alcohol/water solvent system is chosen such that prolamine and gum are soluble in the solvent. A suitable alcohol/water solvent system is about 60% to about 95% by weight ethanol, isopropanol or n-propanol. A texturizing agent can be incorporated into the solution provided that when the texturizing agent is an acid then the traditional gum base is not polyvinylacetate.

In yet another process embodiment, the chewing gum base is prepared by combining prolamine, a food grade anionic emulsifier and water. Alcohol is not required to solubilize the prolamine. In this instance the anionic emulsifier serves to solubilize the prolamine. Examples of suitable anionic emulsifiers include sodium lauryl sulfate or sodium stearoyl lactate. An inorganic salt having a di, tri or polyvalent cation is then added to cause the prolamine to precipitate and entrap the emulsifier and salt therewith. The inorganic salt can be any of those described previously herein.

In a further process embodiment, the chewing gum base is made by first preparing an aqueous alcohol solution of prolamine. To this solution is combined an emulsifier, a wax and/or oil suitable for use in food to form an emulsion. The prolamine, emulsifier and wax and/or oil is then precipitated. Precipitation can be caused by adding a base, an salt, or by centrifugation. The solution can further comprise a traditional gum base and an optional texturizing agent. One advantage of forming a wax latex with zein is that it is stable and will not require heating or high shear for further processing into a chewing gum.

A biodegradable, non-stick chewing gum can be formulated using ally one of the chewing gum bases described above. The chewing gum will comprise a proteinaceous chewing gum base and one or more flavoring and/or sweetening agents. Suitable sweetening agents generally include saccharide containing components commonly known in the chewing gum art which include, but are not limited to, sucrose, dextrose, maltose, dextrin, dried invert sugar, fructose, levulose, galactose, corn syrup solids and the like, alone or in any combination. The amount of sweetening agent(s) will depend upon the desired end product and degree of sweetness expected.

Sugarless gums can also be formulated by incorporation of sugarless sweetening agents into the gum base. Generally sugarless sweeteners include components with sweetening characteristics but are devoid of the commonly known sugars and include sugar alcohols such as sorbitol, mannitol, xylitol, hydrogenated starch hydrolysates, maltitol and the like, alone or in any combination. Intense sweeteners such as saccharin, aspartame, alitame and sucralose can be used. Such sweeteners can comprise up to 2% by dry weight of the chewing gum.

Natural and/or artificial flavoring agents can be present in the chewing gum formulation in the amount of from about 0.1 to about 10.0 weight percent, with from about 0.5 to about 3.0 weight percent of the gum being preferred. Examples of essential oils and synthetic flavors that can be implemented include oils derived from plants and fruits, such as citrus oils, fruit essences (e.g., apple, pear, peach, grape, strawberry, raspberry, cherry, plum, pineapple, apricot), peppermint oil, spearmint oil, clove oil, oil of wintergreen, anise and the like. Aldehyde containing flavoring agents can be used as an alternative and include, cinnamon oil which includes cinamaldehyde, cherry flavor which includes benzaldehyde, lemon flavor which includes vanillin and ethyl vanillin, fruit flavor which includes acetaldehyde, orange flavor which includes undecanal and dodecenal. Other examples of aldehyde containing flavor components are reported in *Flavor Technology: Profiles, Products, Applications,* pp. 325–328, AVI Publishing Co., Westport, Conn. (1978).

The chewing gum can additionally comprise inorganic mineral fillers which are inert and non-toxic. Examples of suitable fillers include calcium carbonate, magnesium carbonate, alumina, talc, dicalcium phosphate, tricalcium phosphate and mixtures of these. Calcium carbonate is preferred.

A chewing gum of this invention is prepared by combining one or more flavoring and/or sweetening agents with the chewing gum base prepared by any one of the methods described above or as set forth in the Examples section. A sweetening agent such as sugar can be added to the chewing gum base by heating the chewing gum base to a temperature at which the chewing gum base becomes tacky or sticky and then adding the flavoring agent. Suitable temperatures range from about 40° C. to about 70° C., but is preferably about 50° C. Following addition of the flavoring agent, the mixture is kneaded at preferably 50° C. to 60° C. with a Sigma mixer or equivalent until homogenous. Another method for adding flavoring agents is by encapsulating flavoring agents in the prolamine.

Traditional chewing gums typically release their flavoring and/or sweetening agents while being chewed, ultimately leaving the chewing gum base as a residue. The traditional chewing gum bases retain their adhesive properties after chewing for extended periods of time and do not significantly lose moisture when stored over a two week period at 20° C. to 25° C. and 30% to 40% relative humidity. In contrast, an advantage of the chewing gum bases of this invention is that the residue dries into a solid mass with a hard outer surface under ambient temperature and relative humidity that does not adhere to natural or synthetic surfaces as discussed above. When stored at 20° C. to 25° C. at 30% to 40% relative humidity for two weeks, the weight of the resulting chewing gum base residue typically drops up to about 36% due to moisture loss. The solid mass can be easily cleaned away, for example by sweeping. Furthermore, rewetting the resulting residue does not immediately render the residue sticky or cause the residue to immediately regain moisture. An additional benefit of the proteinaceous gum base and a gum product containing the gum base is that it is biodegradable and digestible.

To this point the chewing gum and chewing gum bases have been described, however other confections can be made and are embraced by this invention. A suitable confection will be one which is traditionally sticky and chewy, such as caramel, nougat, taffy and the like. Confections made by this invention have the chewy characteristics of traditional confections but the degree of stickiness has been reduced. Stickiness is reduced by adding a prolamine, such as zein, into traditional confection formulations. The prolamine reacts with plasticizers or texturizing agents that are present in the confection formulation to form a proteinaceous chewable base. For example, an aqueous alcohol solution of zein can be made as described above and then admixed into melted caramel. The solvent is removed, such as by evaporation, to yield a caramel which has reduced stickiness initially and shorter texture compared to the starting caramel but retains the elasticity which is an expected property of the caramel. The benefits of reducing stickiness translate into a product having greater consumer appeal.

The invention will be further illustrated by the following non-limiting examples:

EXAMPLES

Materials

Zein was prepared according to U.S. Pat. 5,254,673. Beeswax, Candelilla, and rice bran wax were obtained from Frank B. Ross Co., Inc. (Jersey City, N.J.). Neobee M-5, caprylic/capric triglyceride, was obtained from Stephan Chemical (Northfield, Ill.). ALDO™, a glyceryl monolaurate from Lonza (Fairlawn, N.J.) and Durke 100 oil from Van den Bergh Foods, Inc. (Rockville Ctr., N.Y.). Coconut oil, lactic acid, citric acid, fumaric acid, erythorbic acid, ascorbic acid, stearic acid and pontianak gum were purchased from Aldrich Chemical Company (Milwaukee, Wis.). Neville Chemical Company (Pittsburgh, Pa.). Food grade styrene butadiene rubber (SBR) and isobutylene rubber (IBR) were obtained from Leaf, Inc. (Chicago, Ill.).

Product Characterization

A. Sensory Evaluation

Each test gum was chewed for 2 minutes before the adhesion was measured. The texture of the gum was qualitatively noted after the gum was chewed for 2 minutes. The texture of the test caramels were noted throughout chewing and swallowing. The textures of various commercial chewing gums and chewing gums of the present invention are given in Table I.

B. Particle Size Determination

The particle size of zein and wax latex was determined using either a Microtrac Particle Size Analyzer (Leeds & Northrup Instruments, North Wales, Pa.) or a light microscope (Olympus, BH-2) equipped with a BioScan Optimas image analyzer.

C. Adhesion Test

To assess the adhesion of chewed gum, wood was chosen as the adhesion surface. Using a pulley system the weight required to exceed the adhesion of the gum to the wooden surface was measured. The gum sample was chewed for 2 minutes to eliminate most of the sugars and then allowed to air dry for 1 minute before being placed on the wooden surface. The weight required to exceed the adhesion of the gum was measured. This empirical adhesion force was converted to grams/$cm^2$ by dividing by 1.13 (the area of the dowel in $cm^2$). Between measurements, the face of the wooden dowel was filed to create a fresh surface. The results are reported as an average of at least two measurements for each gum formulation. The adhesion of various commercial chewing gums and chewing gums of the present invention are shown in Table I.

TABLE I

| Type/Formulation | Manufacturer | Adhesion | Texture |
| --- | --- | --- | --- |
| 1. BAZOOKA BUBBLE ™ | Topps | 189 | soft, elastic |
| 2. CHICKLETS ™ | Wrigley | 230 | soft, elastic |
| 3. DENTYNE ™ | Warner Lambert | 339 | soft, rubbery |
| 4. FREEDENT ™ | Wrigley | 328 | hard, |

TABLE I-continued

| Type/Formulation | Manufacturer | Adhesion | Texture |
|---|---|---|---|
| 5. JUICY FRUIT ™ | Wrigley | 170 | rubbery soft, elastic |
| 6. TRIDENT ™ | Warner Lambert | 159 | soft, elastic |
| 7. Styrene Butadiene Rubber Base | — | 289 | soft, elastic |
| 8. Isobutylene Rubber Base | — | 97 | soft, elastic |
| 9. 67% SBR/33% Zein | Opta | 222 | soft elastic |
| 10. 67% IER/33% Zein | Opta | 85 | soft, elastic |
| 11. 50:50 Zein/Lipid Latex | Opta | 48 | soft, rubbery |
| 12. Zein/Lipid Latex 60:30 | Opta | 20 | soft, rubbery |
| 13. 100% Zein | Opta | 24 | hard, rubbery |
| 14. 100% Lipid Latex | Opta | 32 | NA |
| 15. 100% Beeswax | Opta | 179 | NA |

Example 1

Use of Alpha-Hydroxy Acids to Increase the Plasticity and Chewability of Zein Gum Bases A zein solution (100 ml, 10% solids, 80% ethanol) was divided in half. One half was used as the control and diluted to 65 ml with distilled water while to the other half was added a lactic acid buffer (15 ml, 85% lactic acid and 2.5 grams sodium hydroxide). When each fraction was diluted to 100 ml with distilled water, the zein coagulated. The coagulum was squeezed free of excess ethanol and briefly dipped into water to further reduce the residual ethanol. The coagulum with no lactic acid buffer was initially plastic due to the presence of residual ethanol but it rapidly hardened either in air or when it was chewed. By contrast, the zein coagulum containing lactic acid was initially more elastic and after being chewed for at least 15 minutes retained its elasticity without becoming fibrous or breaking apart. During the chewing process, the pleasant acidic flavor of the lactic acid was noted. Equivalent amounts of several other acids (i.e., citric, tartaric, ascorbic and erythorbic) were also used with similar results. It was also noted that the zein coagulum containing lactic acid was initially stickier, making it easier for the sugar to adhere when the procedure described in example 12 was used. After being chewed the fully formulated zein gum base containing alpha-hydroxy acid as a texturizing agent was as non-sticky as an ethanolic zein coagulum. That is, it did not stick to a paper towel, wood or fabric.

The amount of lactic acid required to achieve the desired degree of elasticity was determined by adjusting an ethanolic zein solution (10% solids, 80% ethanol) to 0% 2%, 4%, 6%, 8% and 10% by weight lactic acid and then evaporating aliquots to dryness. An increase in the elasticity of zein was noted when the lactic acid concentrations was at least 2% by weight (i.e. 20% of the zein solids). When the lactic acid level was greater than 80% of the zein solids, a noticeable stickiness was evident, as well as much greater elasticity.

Example 2

Preparation of a Chewing Gum Base Containing Zein and Wax Latex

Glyceryl monolaurate (GML, 4 grams) and beeswax (5 grams) were comelted at 65° C. and added to 100 mL distilled water. The mixture was then stirred briefly. A milky, metastable emulsion formed. The emulsion was then heated to boiling in the microwave (2 minutes) followed by homogenizing (Polytron; Brinkmann Instruments) the mixture immediately at 10,000 rpm for 2 minutes or until the average microemulsion droplet size has been reduced to less than about 50 microns. The emulsion was then immersed in an ice bath, and the homogenization continued until it was cooled to less than 25° C. The microemulsion is thereby converted to a stable microdispersion or wax/lipid latex (9% by weight solids).

A solution of purified zein (10% by weight solids; 80% by volume ethanol; 25° C., 10 ml volume) was slowly added to 20 ml of the aqueous wax/lipid latex. The solution was stirred gently to keep the coagulum intact. After allowing the coagulum to harden for about 2 minutes, it was removed from the supernatant and squeezed to remove the residual water and alcohol. The coagulum could be conveniently chewed for 30 minutes and was found to have a soft texture which did not become fibrous or tough. However, a slightly objectionable waxiness was detected. No significant change in the size of the gum bolus was detected during chewing. At this point the gum bolus was removed from the mouth and firmly placed on a paper towel. It was found to be completely non-adhesive. It did not adhere to the towel, even after being pressed flat with thumb pressure for five seconds.

Example 3

Preparation of a Chewing Gum Base Containing Zein and a Wax Latex Containing Emulsifiers, Oils and Fatty Acids A stable microemulsion or wax latex was prepared according to the procedure described in Example 2 using the following formulation: glyceryl monolaurate (10.4 grams; 26% by weight), beeswax (16.8 grams; 42% by weight), stearic acid (2 grams; 5% by weight) and coconut oil (10.4 grams; 26% by weight).

The chewing gum base was prepared from the wax latex and a solution of purified zein (80% ethanol; 10% solids 25° C.) according to the same procedure used in Example 2. When chewed, this gum bolus had a 45 minute chew-life and its soft, chewy texture did not change appreciably over this time course. The zein did not become fibrous or fragment in the mouth. To that extent, it was much better than the product of Example 2. After chewing for 45 minutes, the gum bolus showed no adhesion to the paper towel when subjected to the paper towel test as described in Example 2. The texture and chew out of this gum seem very similar to a commercial gum like TRIDENT™ (Warner-Lambert). In addition, there was no change in gum bolus size during chew-out.

A chewing gum base containing zein and a wax latex can also incorporate a texturizing agent. An aqueous beeswax latex (10% by weight solids) prepared as described above was added to an equal volume of lactic acid (30%). The stable latex was then mixed with an equal volume of zein (10% solids, 80% ethanol) resulting in the coagulation of the zein component and the entrapment of the wax latex. The coagulum was collected, squeezed free of excess fluid and then slurried for a minute in distilled water. It was more elastic than gum bases prepared without lactic acid as described above.

Example 4

Preparation of a Chewing Gum Base Containing Zein and a Wax Latex Containing a Mixture of Emulsifiers and Oils A wax latex (10% solids by weight, 300 ml total volume) was prepared according to the procedure described in Example 2. The formulation consisted of the following mixture of oils: Neobee M-5, a medium chain triglyceride (9.0 grams, 30% by weight); Durkex 100 oil (13 grams, 46% by weight), glyceryl monolaurate (0.3 grams, 1% by weight), coconut oil (2.4 grams, 8% by weight) and beeswax (4.5 grams, 15% by weight, comelted before addition). The stoichiometry and formulation of the lipid phase is dependent on the desired textural properties of the gum base and the degree to which the zein needs to be plasticized and stabilized. The chewing gum base was prepared from the wax latex and a solution of purified zein (80% ethanol; 10% solids; 25° C.) according to the same procedure used in Example 2.

When chewed, the gum bolus was initially found to have a soft texture. With prolonged chewing, some reduction in the size of the gum bolus was noted. As the size of the gum bolus shrank, a tougher texture was noted. After chewing for 30 minutes the gum bolus showed no adhesion to the paper towel when subjected to the paper towel test as described in Example 2.

Example 5

Using Zein to Reduce the Stickiness of Synthetic Rubber Chewing Gum Base

One gram of styrene-butadiene rubber (SBR) gum base pellets were placed in a thermostatted mortar and heated at 50° C.–60° C. As soon as the SBR pellets reached 50°–60° C., they became very sticky and readily adhered sugar. The pestle was used to spread the gum base as a thin layer on the mortar surface after addition of each of the following flavorings: sucrose (1.6 grams; 26% by weight), dextrose (2.5 grams; 40% by weight), flavor (optional; less than about 1% by weight), corn syrup (0.9 ml; 14% by weight) and sorbitol solution (0.2 ml; 3% by weight). After full sugaring, the gum base represents approximately 15% of the gum by weight. After chewing the fully sugared gum bolus for 2 minutes, most of the sugar was released and the gum became very sticky. When the gum bolus was subjected to the paper towel test as described in Example 2, it immediately adhered to the paper.

One gram of the synthetic gum base pellets (SBR or IBR) was heated in a thermostatted mortar (50°–60° C.) until it softened and became sticky. To this, was added a zein solution (1.5 ml, 20% solids; 80% ethanol) containing 5% by weight glycerol. This was immediately followed by the addition of a mixture of comelted glyceryl monolaurate (0.1 grams) and beeswax (0.3 grams). The resultant mass was vigorously stirred with the pestle until all the solvent had evaporated and the mass had a slightly molten, plastic texture. This composite gum base was sugared as described above. In the final formulation the zein was 18% by weight of the gum base and the gum base was approximately 15% by weight of the total gum. This composite gum base easily adhered the sugars which were released after chewing for 2 minutes. The gum bolus showed no adhesion when subjected to the paper towel test as described in Example 2. The chewing texture of this gum was acceptable but harder than a zein/wax gum flavored in a similar fashion from the chewing gum base of Example 4. A tendency of the gum to fragment after being chewed for longer than 15 minutes was attributed, in part, to the non-uniform mixing of the zein and synthetic resin using the improvised mortar and pestle conditions.

As a control, the above procedure was repeated without using zein but retaining the GML and beeswax components. The result was a gum base that was so sticky that it stuck tenaciously to the mortar, pestle and to fingers, making it very difficult to mix and sugar. After chewing the gum stuck tenaciously to a paper towel.

Example 6

Use of Zein to Reduce the Stickiness of Polyvinylacetate Chewing Gum Base

A zein solution (6% solids, 80% ethanol) was combined with an equal volume (5 ml) of polyvinylacetate (PVAc; Union carbide, 4% solids, 80% ethanol) to produce a clear, homogeneous solution. The zein/PVAc solution was then precipitated by the addition of 10 ml distilled water to produce a coagulum. The coagulum was washed, briefly with 10 ml of water and then chewed. The coagulum was found to be soft and chewy. After chewing for 5 minutes the texture of the gum become rubbery and less elastic. After chewing for about 10 minutes the gum bolus had lost most of its elasticity and began to fragment.

To improve the plasticity of the zein/PVAc gum base, the following formulation was prepared: PVAc (0.38 grams) was dissolved in an ethanolic zein solution (10 ml, 12% zein solids; 80% ethanol) by heating to about 55° C. This solution was coprecipitated with the wax lipid latex (6 ml, 10% by weight solids) prepared according to Example 3. After washing the coagulum briefly with water and drying (less than about 40° C.) the gum base was sugared according to the procedure described in Example 5. The resultant fully sugared gum base was chewed and found to have a softer, more plastic texture. Prolonged chewing (greater than about 30 minutes) still resulted in fragmentation of the gum base which was attributed, in part, to the non-uniform distribution of the sugar(s) using the improvised mortar and pestle for the mixing.

An alternative procedure to that described above involved combining equal volumes of an ethanolic zein solution (20% zein, 80% ethanol, 5% glycerol) with an ethanolic PVAc solution (20% PVAc, 80% ethanol, 5% glycerol) followed by addition of a mixture of comelted GML (2%) and beeswax (6%). Heating the mixture in a microwave (1 minute intervals) followed by intermittent stirring resulted in a uniform mixture which was then transferred to the thermostatted mortar and heated until all the solvent was removed. The resultant paste was placed in a shallow dish and cooled to 25° C. which produced a nonsticky, plastic mass which could readily be cut into strips or pellets of approximately 1 gram each.

Example 7

Acidic and Salt Coagulation of Ethanolic Zein

A 10% zein solution was prepared in 80% EtOH in the standard manner. Two milliliters of this solution was dropped, successively, in each of the following 2% by weight solutions of various salts, inorganic acids, organic acids and Lewis acid(s): acetic, lactic, hydrochloric, sulfuric, phosphoric, cysteine, ammonium chloride and calcium chloride. It was noted that homogeneous, milky white latexes formed immediately in the acetic, lactic, and phosphoric acid solutions. In all the other aqueous, acidic solutions the zein immediately formed a sticky coagulum that rapidly became less sticky if it was removed from the acidic solution and washed in water. Using the forgoing methods, it was thereby possible to mix zein and wax latexes whereby the former was made with phosphoric acid, amino acid, cysteine, lactic acid, citric acid or acetic acid. Similarly, it was possible to cleanly precipitate the zein in the presence of other water dispersible and/or soluble gum base additives by using one of the precipitating bases or neutral salts (HCl, $NH_4Cl$, $CaCl_2$ or $H_2SO_4$).

Example 8

Use of Anionic Emulsifiers to Incorporate Zein Into Chewing Gum Base

To 100 ml of distilled water was added 3 grams of sodium dodecyl sulfate (SDS), followed by stirring until a clear solution resulted. To this, was added 1 gram of zein powder followed by slow stirring and heating to boiling until the zein was converted into a clear, micelle emulsion. A 5% calcium chloride solution was prepared. The SDS/zein emulsion was then added to the $CaCl_2$ solution, resulting in the immediate precipitation of the SDS/zein complex as a very soft, gelatinous coagulum. This example illustrates a way of stabilizing zein (as a micelle) and precipitating the micelle as the calcium salt of the emulsifier to produce a soft-textured coagulum which can be altered either by performing the precipitation in the presence of other additives or mixing them in subsequently.

Example 9

Measuring the Post-chew Environmental Compatibility of the Zein Chewing Gum

The relative environmental compatibility of the zein gum bases compared to traditional, synthetic gum bases was investigated as a function of time. The results are given in Table II. Each gum sample was weighed immediately after being chewed, 7 days later and 2 weeks later. The chewed gum samples were stored at 20°–25° C. and 30–40% relative humidity. The commercial gum bases retained their original weight and stickiness. In contrast, the zein-based gum samples dried up and formed a hard outer surface which would allow them to be easily swept up. The average moisture loss after 2 weeks for the commercial gums was about 5% while that for the zein-based gums was about 36%. This indicated substantial dehydration and hardening if the zein based gums are discarded at standard temperatures and low humidity. Under high relative humidity the zein gum base samples have been shown to be nonsticky. Rewetting the dried zein gum base did not render them sticky or immediately alter their size or texture. It is expected that the zein portion of the gum base would enzymatically degrade if exposed to moisture and the environment.

TABLE II

| Gum Type | Original, Sugared Weight (gram) | Post-chew (T1) Weight (gram) | T1 + 7 days Post-chew | T1 + 2 wks Post-chew |
|---|---|---|---|---|
| CHICKLETS ™ | 1.64 | 0.37 | 0.36 | 0.32 |
| BAZOOKA ™ | 7.62 | 2.17 | 2.13 | 2.01 |
| JUICY FRUIT ™ | 3.05 | 0.93 | 0.93 | 0.88 |
| DENTYNE ™ | 1.72 | 0.85 | 0.77 | 0.75 |
| FREEDENT ™ | 3.18 | 0.76 | 0.75 | 0.72 |
| 50:50 zein/OP* | 2.73 | 0.92 | 0.53 | 0.48 |
| 66:33 zein/OP* | 4.3 | 1.30 | 1.21 | 1.15 |
| 100% zein | 4.8 | 1.44 | 0.94 | 0.63 |

OP = Oil phase (i.e. wax/oil/monoglyceride)

Example 10

Preparation of a Food Grade Wax Latex which can Easily be Incorporated into Chewing Gum Base To achieve discontinuous micro homogeneity of the zein and wax components, a zein latex was prepared according to a modification of the procedure described in U.S. Pat. No. 5,182,130. An alcoholic zein solution (10 ml, 10% solids) was mixed rapidly with citric acid (10 ml, 2% w/v) until a stable, milky latex formed (mean diameter (mv): 0.4 micron). The residual alcohol and water was removed by rotary evaporation under vacuum until the solids content was 15%. No significant agglomeration of the latex occurred during concentration. The zein latex was then mixed with a wax latex (10% solids, prepared according to Example 4 or alternatively Examples 2 and 3) without any agglomeration. The fluid mixture of latices can then be coprecipitated by centrifugation (10,000 rpm, 10 minutes) producing a gum base which retains its plasticity even after storage at ambient temperature for several weeks. Increasing the ionic strength of the latex mixture (addition of a few drops of 10% NaCl) will facilitate the precipitation and reduce the time and centrifugation speed required to pelletize the gum base. The zein/wax mixing procedure can be combined with any of the examples that involve coprecipitation. This is illustrated in the following examples. Other modifications will be obvious to those skilled in the art:

a) After combination of the zein and wax latices, the pH was raised with 1N NaOH until the zein latex agglomerated. Initially the resultant coagulum had excellent elastic properties.

b) When a zein solution (5% solids, 80% ethanol) was mixed with an equal volume of the pelletized mixture of zein and wax latices, the zein was found to bind the bolus together. This allowed greater elasticity without fracturing and still retained the non-hardening texture characteristic.

c) Corn gluten (5% solids), deflavored and decolorized according to the methods described in U.S. Pat. No. 5,254,673, was readily dispersed in the wax latex (10% solids, prepared according to Example 3) and then combined with zein latex or with ethanolic zein (equal volume of 80% ethanol) or a combination thereof as described above and centrifuged. The ratio of corn gluten powder to zein can vary over a wide range: from 95:5 to 0.2:1. In the former case, the zein is used as a binder, in the latter case, the gluten is used as a filler for the gum base. Other gum base fillers, known in the art can be used with or instead of the corn gluten.

Example 11

Preparation of a Sugared Chewing Gum Using Zein/Wax Gum Base

A one gram pellet of zein/wax coagulum prepared as described in Example 4 was placed in the thermostatted mortar (50°–60° C.) until it softened and became slightly sticky. The pestle was used to spread the gum base as a thin layer on the mortar surface after addition of each of the following flavorings: sucrose (1.6 gram; 26% by weight), dextrose (2.5 gram; 40% by weight), flavor (optional; less than 1% by weight), corn syrup (0.9 ml; 14% by weight), and sorbitol solution (0.2 ml; 3% by weight). After full sugaring, the gum base represents approximately 15% of the gum weight.

Then the fully sugared gum was chewed vigorously for 2 minutes during which most of the sugar was released and the stickiness of the gum could be reliably determined using the adhesion test described above. The influence of wax/zein ratio was determined using the above protocol and the results are reported in Table I.

Example 12

Use of Prolamines Other than Zein to Produce Chewing Gum Base

To illustrate that prolamines and glutens from sources other than corn could be used, a Do-prep Vital Wheat Gluten was incorporated into the following experiments. Isobutylene rubber gum base (1 gram) was placed in a thermostatted mortar (about 55° C.) and mixed until sticky. To this was added wheat gluten powder (0.4 gram), followed by a comelted mixture of glyceryl monolaurate (0.1 gram) and beeswax (0.3 gram). After thorough mixing, the sugars were incorporated as described in Example 11. The resulting gum base was relatively nonsticky until the glyceryl monolaurate and beeswax were added. The chew texture of the gum was soft and had good integrity but it did exhibit some stickiness in the paper towel test.

To eliminate the residual post-chew stickiness, a higher ratio of gluten to gum base was used (i.e. increased from 22% to 50% by weight). Do-Pap Vital Wheat Gluten (0.5 gram) was combined with isobutylene rubber (0.5 gram), followed by the addition of a comelted mixture of glyceryl monolaurate (0.1 gram), 0.3 gram beeswax. After mixing the sugars were incorporated as described in Example 11. The resultant 1:1 wheat gluten/gum mixture was not sticky but chewed somewhat hard and dry. The optimum ratio was, therefore, assumed to be between 25 and 50% by weight.

A further variant of this formulation was to separate the gliadin and glutenin portions of the gluten during the mixing step. This was done by dispersing the wheat gluten in ethanol (60%) at a solids level of 20% by weight and heating to 50° C. for 15 minutes. This ethanolic stock solution, containing dissolved gliadin and suspended glutenin was used instead of the powder in the protocol described above and followed by evaporation of the residual solvent to dryness in the mortar before addition of the sugars.

Example 13

Use of Zein to Modulate the Stickiness of Caramel Confections

| Commercial Caramel Apple Topping Recipe | |
|---|---|
| | Wt (grams) |
| High fructose corn syrup (ADM) | 40 |
| Sucrose | 9 |
| Condensed milk | 45 |
| Salt | 0.2 |
| Coconut oil | 3 |
| Baking soda | 0.3 |
| Distilled water added up to 100 ml | |

1. After all the above ingredients, except bicarbonate, are combined in a saucepan, they were heated to 122° C. with stirring.
2. The bicarbonate is then added with thorough mixing.
3. The product is cooled and placed in a refrigerator overnight to harden.
4. The adhesion test was performed as described for the chewing gum base.
5. Commercially prepared caramel candy (i.e. Brach's Milk Maid and Callard & Bower English Toffees) adhesion was also measured using the standard adhesion test for chewing gum base.

Zein/Caramel Formulation Procedure

1. The controls were prepared by adding different ratios of 80% ethanol to commercial caramels (A=apple topping, prepared above and B=Brach's Milk Maid Caramel) and then evaporating both ethanol and water in a microwave with 20 seconds exposures followed by intermittent mixing.
2. The test samples were treated similarly except the 80% alcohol containing 7% zein solids were added to the caramel. After the solids were removed by microwave evaporation the zein solids remained with the caramel.
3. The Caramel Adhesion (shown below in Table III) indicates the adhesion as a function of the zein (% w/w) incorporated into the caramel.

TABLE III

Caramel Adhesion

| Formulation | Adhesion (gram) | Sensory |
|---|---|---|
| 1. Control A (3:9)*; 0% zein | 266 | Sticky, sweet, soft, smooth |
| 2. Control A (9:9); 0% zein | 272 | Sticky, sweet, soft, smooth |
| 3. Zein + A (1:9); 0.7% zein | 242 | Sticky, sweet, soft, smooth |
| 4. Zein + A (3:9); 2.3% zein | 188 | Sticky, sweet, chewy, smooth |
| 5. Zein + A (6:9); 4.5% zein | 123 | Sticky, sweet, chewy, chalky |
| 6. Zein + A (9:9); 6.7% zein | 35 | Sticky, sweet, soft, smooth residual ethanol; dissolved quickly |
| 7. Control B (3:9); 0% zein | 121 | Sticky, sweet, smooth, slight residual ethanol taste |
| 8. Control B (9:9); 0% zein | 45 | Sticky, sweet, soft, smooth; strong ethanol taste |
| 9. Zein + B (1:9); 0.7% zein | 236 | Sticky, sweet, soft, smooth slight ethanol taste |
| 10. Zein + B (3:9); 2.3% zein | 145 | Sticky, sweet, soft, smooth ethanol taste |
| 11. Zein + B (6:9); 4.5% zein | 35 | Sticky, sweet, soft, smooth strong ethanol taste, dissolves |
| 12. Zein + B (9:9)6.7% zein | 31 | Sticky, sweet, soft, smooth strong ethanol taste, dissolves |

*Wt. ratio of 80% ethanol to caramel (Re: controls) or 80% EtOH containing 7% zein to caramel (test samples).
1. Control A was a caramel prepared in the laboratory while B was a commercial, Brach's caramel.

Equivalents

Those skilled in the art will know, or be able to ascertain using no more than routine experimentation, many equivalents to the specific embodiments of the invention described herein. These and all other equivalents are intended to be encompassed by the following claims.

I claim:

1. A proteinaceous chewable base, comprising prolamine having a texturizing agent entrapped therein, produced by solubilizing prolamine and then co-precipitating prolamine with a texturizing agent.

2. The proteinaceous chewable base of claim 1, wherein prolamine is selected from the group consisting of zein, gliadin, horedein and combinations thereof.

3. The proteinaceous chewable base of claim 2, wherein the texturizing agent is a food grade organic acid, food grade mineral acid, an α-hydroxy acid, a mono-, di- or tri- carboxylic acid, a Lewis acid salt, a C3–C4 hydroxyalkyl ester of an organic acid, a C2–C5 alkyl ester of an organic acid, a C1–C5 alkyl ester of an α-hydroxy acid, a salt of an organic acid, a salt of an α-hydroxy acid, amino acid, amine salt, polymeric acids and combinations thereof.

4. The proteinaceous chewable base of claim 3, wherein the α-hydroxy acid is selected from the group consisting of lactic acid, citric acid, tartaric acid, malic acid and combinations thereof.

5. The proteinaceous chewable base of claim 3, wherein the food grade mineral acid is selected from the group consisting of phosphoric acid, hydrochloric acid, sulfuric acid and combinations thereof.

6. The proteinaceous chewable base of claim 3, further comprising a traditional gum base.

7. The proteinaceous chewable base of claim 4, wherein the traditional gum base is selected from the group consisting of styrene butadiene rubber, isobutylene rubber, isobutylene/isoprene copolymer, chicle, pontianak gum, jelutong gum and polyvinylacetate; provided that when the texturizing agent is an acid then the traditional gum base is not polyvinylacetate.

8. The proteinaceous chewable base of claim 1, further comprising an emulsifier and a wax and/or oil suitable for use in food.

9. The proteinaceous chewable base of claim 8, wherein the wax is selected from the group consisting of beeswax, paraffin wax, japan wax, ceresin wax, carnauba, microcrystalline wax, sugercane wax, rice bran wax and candelilla wax.

10. The proteinaceous chewable base of claim 8, wherein the emulsifier has a hydrophilic lipophilic balance of equal to or greater than about 2 and is selected from the group consisting of monoglycerides, hydroxycarboxylic fatty acid esters, lactylate fatty acid esters, polyglycerol fatty acid esters, phosphotides, ethylene or propylene glycol fatty acid esters, and sorbitan fatty acid esters.

11. The proteinaceous chewable base of claim 8, further comprising a traditional gum base.

12. The proteinaceous chewable base of claim 11, wherein the traditional gum base is selected from the group consisting of styrene butadiene rubber, isobutylene rubber, isobutylene/isoprene copolymer, pontianak gum, jelutong gum, polyvinylacetate and chicle; provided that when the texturizing agent is an acid then the traditional gum base is not polyvinylacetate.

13. A chewing gum, comprising the proteinaceous chewable base of claim 1 and one or more flavoring and/or sweetening agents.

14. A chewing gum, comprising the proteinaceous chewable base of claim 8 and one or more flavoring and/or sweetening agents.

15. A chewing gum, comprising the proteinaceous chewable base of claim 11 and one or more flavoring and/or sweetening agents.

16. A proteinaceous chewable base, comprising zein having a wax and/or oil suitable for use in food, and an emulsifier entrapped therein, produced by solubilizing zein and then coprecipitating the zein with the wax and/or oil and emulsifier.

17. The proteinaceous chewable base of claim 16, further comprising a traditional gum base.

18. The proteinaceous chewable base of claim 17, wherein the traditional gum is selected from the group consisting of styrene butadiene rubber, polyvinylacetate, isobutylene rubber, isobutylene/isoprene copolymer, chicle, pontianak gum and jelutong gum.

19. The proteinaceous chewable base of claim 16, wherein the wax is selected from the group consisting of beeswax, paraffin wax, japan wax, ceresin wax, carnauba, microcrystalline wax, sugarcane wax, rice bran wax and candelilla wax.

20. The proteinaceous chewable base of claim 16, wherein the emulsifier has a hydrophilic lipophilic balance equal to or greater than about 2 and is selected from the group consisting of monoglycerides, hydroxycarboxylic fatty acid esters, lactylate fatty acid esters, polyglycerol fatty acid esters, phosphotides, ethylene or propylene glycol fatty acid esters, and sorbitan fatty acid esters.

21. A chewing gum, comprising the proteinaceous chewable base of claim 16 and one or more flavoring and/or sweetening agents.

22. A chewing gum, comprising the proteinaceous chewable base of claim 17 and one or more flavoring and/or sweetening agents.

23. A process for preparing proteinaceous chewable base, comprising the following steps:
   a) preparing a solution comprising prolamine in an aqueous alcohol solvent, wherein prolamine is soluble in the solvent;
   b) adding an aqueous solution of texturizing agent to the alcoholic prolamine solution to precipitate the prolamine and entrap the texturizing agent therein, thereby forming the chewable base; and
   c) separating the chewable base from the solvent.

24. The process of claim 23, wherein the texturizing agent is selected from the group consisting of food grade organic acid, food grade mineral acid, an α-hydroxy acid, a mono-, di- or tri- carboxylic acid, C3–C4 hydroxyalkyl ester of an organic acid, a Lewis acid salt, a C1–C5 alkyl salt, a C1–C5 alkyl ester of an organic acid, a C1–C5 alkyl ester of an α-hydroxy acid, a salt of an organic acid, a salt of an α-hydroxy acid, amino acid, amine salt, polymeric acids and combinations thereof.

25. A process for preparing a proteinaceous chewable base, comprising the following steps:
   a) preparing a solution comprising prolamine and a texturizing agent in an aqueous alcohol solvent, wherein the prolamine is soluble in the solvent;
   b) causing the prolamine to precipitate from solution and entrap the texturizing agent therein, thereby forming the chewable base; and
   c) separating the chewable base from the solution.

26. The process of claim 25, wherein step (b) is performed by adding a sufficient amount of an aqueous solution containing alkali to the solution when the texturizing agent is an acid.

27. A process of claim 25 wherein step (b) is performed by adding an aqueous solution of a neutral inorganic salt of an acid or an organic acid salt to the solution, wherein the salt is further entrapped in the precipitated prolamine.

28. A process of claim 25 wherein step (b) is performed by adding water to the solution in an amount in which the prolamine is no longer soluble therein.

29. The process of claim 26, wherein the alkali is selected from the group consisting of sodium hydroxide, potassium hydroxide, potassium carbonate and triethanolamine.

30. The process of claim 25, wherein the neutral salt is selected from the group consisting of sodium or potassium chloride, sodium or potassium phosphate, or sodium or potassium sulfate.

31. A process for preparing a chewing gum with non-adhesive properties after chewing, comprising adding one or more flavoring and/or sweetening agents to a proteinaceous chewable base, comprising prolamine having a texturizing agent entrapped therein, prepared by the process of claim 23.

32. A process for preparing a chewing gum with non-adhesive properties after chewing, comprising adding one or more flavoring and/or sweetening agents to a proteinaceous chewable base, comprising prolamine having a texturizing agent entrapped therein, prepared by the process of claim 25.

33. A process for preparing a proteinaceous chewable base, comprising the following steps:
   a) preparing a solution comprising prolamine and polyvinylacetate in an aqueous alcohol solvent, wherein the prolamine is soluble in the solvent,
   b) adding water to the solution of step (a) to cause the prolamine to precipitate out of solution and entrap the polyvinylacetate therein, thereby forming the chewable base; and
   c) separating the chewable base from the solution.

34. A process for preparing a proteinaceous chewable base, comprising the following steps:
   a) preparing a solution comprising prolamine in an aqueous alcohol solvent, wherein the prolamine is soluble in the solvent;
   b) combining the solution of step a) with an aqueous emulsion or latex comprising emulsifier, a wax and/or oil suitable for use in food to form an emulsion;
   c) precipitating the prolamine thereby entrapping the emulsifier and wax and/or oil therein to form the chewable base; and
   d) separating the precipitated chewable base from the solvent.

35. The process of claim 34, wherein the solution of prolamine in the alcohol/water solvent further comprises a traditional gum base and optional texturizing agent, provided that when the texturizing agent is an acid then the traditional gum base is not polyvinylacetate.

36. The process of claim 34, wherein the solution of step (a) further comprises a texturizing agent.

37. The process of claim 34 wherein step (c) is performed by one of the following:
   a) adding an aqueous solution of alkali provided that an acid is present in the solution of step (a);
   b) adding an aqueous solution of an inorganic salt; or
   c) centrifugation if step (b) is performed by combining an acidic prolamine latex with a wax latex.

38. The process of claim 34, wherein the wax is selected from the group consisting of beeswax, paraffin wax, japan wax, ceresin wax, carnauba, microcrystalline wax, sugarcane wax, rice bran wax and candelilla wax.

39. The process of claim 34, wherein the emulsifier has a hydrophilic lipophilic balance of equal to or greater than about 2 and is selected from the group consisting of monoglycerides, hydroxycarboxylic fatty acid esters, lactylate fatty acid esters, polyglycerol fatty acid esters, phosphotides, ethylene or propylene glycol fatty acid esters, and sorbitan fatty acid esters.

40. A process for preparing a chewing gum with non-adhesive properties after the gum is chewed, comprising combining one or more flavoring and/or sweetening agent to a proteinaceous chewable base comprising prolamine having polyvinylacetate entrapped therein, prepared by the process of claim 33.

41. A process for preparing a chewing gum with non-adhesive properties after the gum is chewed, comprising combining one or more flavoring and/or sweetening agent to a proteinaceous chewable base comprising prolamine having emulsifier and wax and/or oil entrapped therein, prepared by the process of claim 34.

42. A process for preparing a proteinaceous chewable base, comprising the following steps:
   a) combining a traditional gum base, with a solution comprising prolamine solubilized in an aqueous alcohol solvent, an emulsifier, a wax and/or oil suitable for use in foods; and mixing the combination of step a) and removing the solvent therefrom to produce the chewable base.

43. The process of claim 42, wherein step (b) is performed at elevated temperature to evaporate the solvent.

44. The process of claim 43, wherein the temperature is from about 45° C. to about 75° C.

45. The process of claim 42 further comprising a texturizing agent, provided that when the texturizing agent is an acid then the traditional gum is not polyvinylacetate.

46. A process for preparing a proteinaceous chewable base, comprising the following steps:
   a) combining prolamine, a food grade anionic emulsifier, and water under agitation so that the prolamine is solubilized;
   b) adding a solution of inorganic salt having a bi, tri or polyvalent cation to the product of step a), to cause the prolamine to precipitate thereby entrapping the emulsifier and the salt therewith; and
   c) separating the precipitated chewable base from the solvent.

47. The process of claim 35 wherein the solution of step (a) further comprises a texturizing agent, wax, emulsifier, traditional gum base and combinations thereof.

48. A proteinaceous chewable base comprising prolamine having a texturizing agent entrapped therein, prepared by the process of claim 23.

49. A proteinaceous chewable base comprising prolamine having a texturizing agent entrapped therein, prepared by the process of claim 25.

50. A proteinaceous chewable base comprising prolamine having polyvinylacetate entrapped therein, prepared by the process of claim 33.

51. A proteinaceous chewable base comprising prolamine having emulsifier and wax and/or oil entrapped therein, prepared by the process of claim 34.

52. A proteinaceous chewable base comprising a traditional gum base and prolamine having an emulsifier and an oil and/or wax entrapped therein, prepared by the process of claim 42.

53. A proteinaceous chewable base comprising prolamine having an emulsifier and salt entrapped therein, prepared by the process of claim 46.

54. A confection comprising a proteinaceous chewable base comprising prolamine having a texturizing agent entrapped therein, produced by solubilizing prolamine and then co-precipitation prolamine with a texturizing agent, wherein the chewable base has a shorter texture and less stickiness compared to similar confection made without the chewable base.

55. The confection of claim 54 that is caramel, chewing gum, taffy or nougat.

56. A process for making a confection comprising a proteinaceous chewable base having a shorter texture and less stickiness compared to similar confection made without the chewable base, comprising:
   a) admixing the aqueous alcoholic solution of prolamine to a confection formulation wherein the prolamine and texturizing ingredients contained in the confection formulation form a proteinaceous chewable base; and
   b) removing the alcohol solution from the product of step (a), to thereby yield a confection which as a shorter texture and less stickiness compared to similar confection made without the prolamine.

57. A proteinaceous chewable base, comprising prolamine having polyvinylacetate entrapped therein, produced by solubilizing prolamine and then co-precipitating prolamine with polyvinylacetate.

58. A proteinaceous chewable base, comprising prolamine having an emulsifier and wax and/or oil entrapped therein, produced by solubilizing prolamine and then co-precipitating prolamine with an emulsifier and wax and/or oil.

59. A proteinaceous chewable base, comprising prolamine having an emulsifier and salt entrapped therein, produced by solubilizing prolamine and then co-precipitating prolamine with an emulsifier and salt.

* * * * *